L. L. LIBBY.
TRANSMISSION BAND LINING.
APPLICATION FILED JULY 24, 1920.

1,405,601.

Patented Feb. 7, 1922.

L. L. Libby, INVENTOR

UNITED STATES PATENT OFFICE.

LEWIS L. LIBBY, OF PLAINFIELD, NEW JERSEY, ASSIGNOR TO HARRY T. SHRIVER, OF WEST ORANGE, NEW JERSEY.

TRANSMISSION-BAND LINING.

1,405,601.   Specification of Letters Patent.   Patented Feb. 7, 1922.

Application filed July 24, 1920. Serial No. 398,647.

*To all whom it may concern:*

Be it known that I, LEWIS L. LIBBY, a citizen of the United States, residing at Plainfield, in the county of Union and State of New Jersey, have invented new and useful Improvements in Transmission-Band Linings, of which the following is a specification.

My present invention has for its object the provision of a transmission band lining for use particularly in combination with the bands and drums of an automobile transmission and constructed with a view to facilitating its introduction to working position and also constructed with a view to eliminating strain when the low speed is applied as well as to obviate dragging of the lining.

To the attainment of the foregoing the invention consists in the improvement as hereinafter described and definitely claimed.

In the accompanying drawings, hereby made a part hereof:—

Similar numerals of reference designate corresponding parts in all of the views of the drawings.

Figure 1:
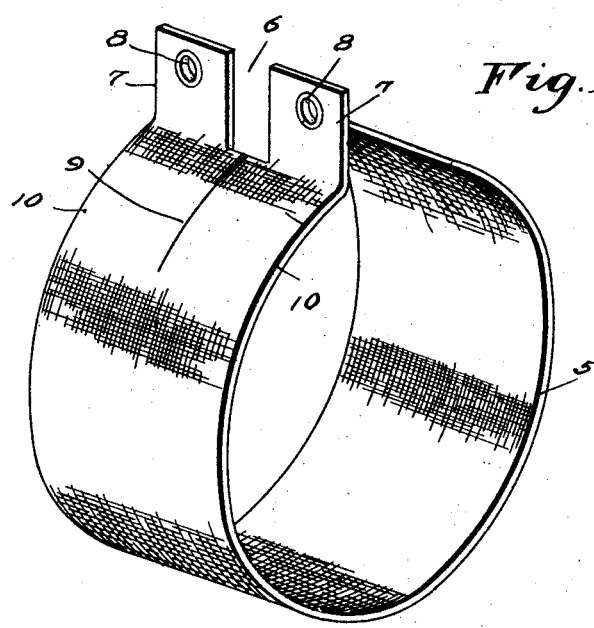
Figure 1 is a perspective view showing my improved band lining per se.

The transmission shown is of the ordinary well known construction, being made up of a casing 1, a brake drum 2 a low speed drum 3, a reverse drum 4, and bands $2^a$, $3^a$ and $4^a$, complementary to the drums 2, 3 and 4, respectively.

My novel band lining 5, in common with the band lining of my contemporary application filed October 28, 1919, Serial No. 333,997, is of a width equal to the combined widths of the group of drums 2, 3 and 4. The lining 5 is preferably, though not necessarily, of appropriate textile material. At one end the lining is bifurcated as indicated by 6, and each of the tabs 7 thereby provided is equipped with an eyelet 8 to receive a speed lever.

In accordance with my present invention I slit or cut the lining 5, as indicated by 9; the said slit or cut 9 occupying or being arranged adjacent to the longitudinal center of the lining and being carried about the proportional distance illustrated from the base of the bifurcation 6. The said longitudinal slit or cut 9 manifestly provides the lining with two side by side portions 10 each of which is freely movable independently of the other.

Figure 2:
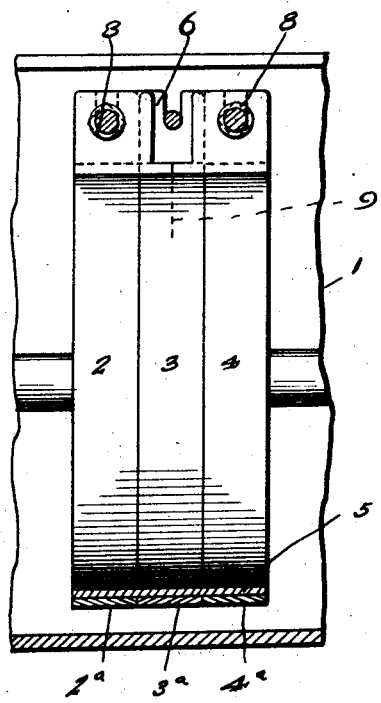
Figures 2 and 3 are views illustrative of the arrangement of the lining relatively to the ordinary elements of a Ford transmission.
Figure 3:
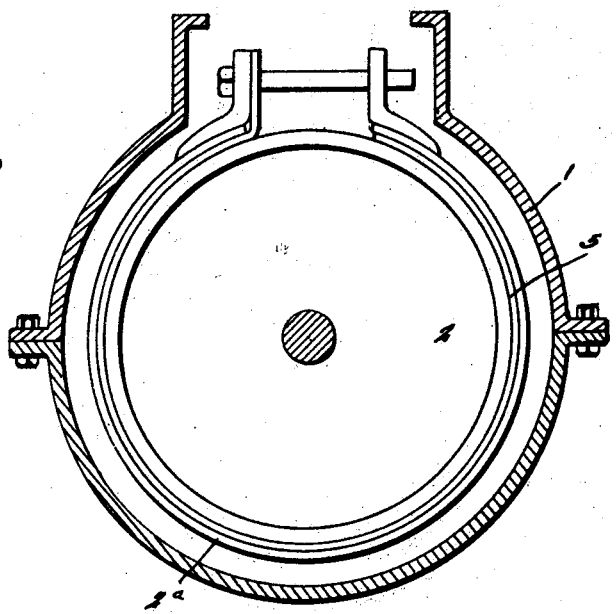

The application of my novel lining will be fully appreciated by comparison of Figures 2 and 3, and when the lining is so applied it will be manifest that the longitudinal central cut 9 will effectively prevent dragging of the lining and the imposition of strain on the lining when the low speed is applied to the lining; and it will also be noted that the longitudinal central cut and the portions 10 afforded thereby will make it very easy to replace the lining after the same has been first applied.

Having described my invention, what I claim and desire to secure by Letters-Patent, is:—

1. As a new article of manufacture, a transmission band lining for interposition between the drums and the bands of a transmission; the said lining having one end bifurcated and apertures in the arms of the bifurcation and also having a longitudinal central slit or cut extending from the base of the bifurcation and forming side by side portions.

2. As a new article of manufacture, a transmission band lining for interposition between the drums and the bands of a transmission; the said lining having one end bifurcated and adapted to be fastened to the bands and also having a longitudinal central slit or cut extending from the base of the bifurcation and forming side by side portions.

In testimony whereof I affix my signature.

LEWIS L. LIBBY.